A. R. BULLOCK.
CONDENSER ARRANGEMENT.
APPLICATION FILED MAR. 20, 1911.
1,048,034.
Patented Dec. 24, 1912.
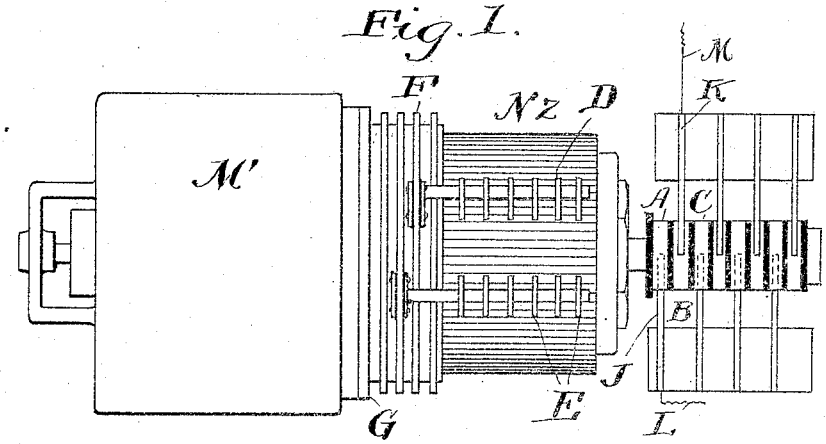
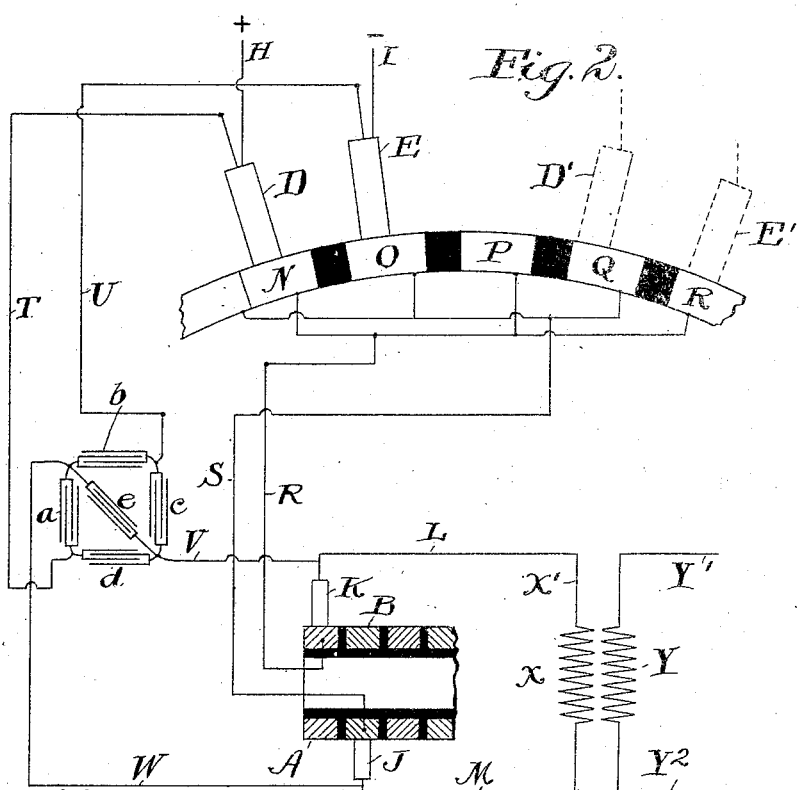

UNITED STATES PATENT OFFICE.

ARTHUR R. BULLOCK, OF CLEVELAND, OHIO.

CONDENSER ARRANGEMENT.

1,048,034. Specification of Letters Patent. Patented Dec. 24, 1912.

Application filed March 20, 1911. Serial No. 615,787. REISSUED

*To all whom it may concern:*

Be it known that I, ARTHUR R. BULLOCK, a citizen of the United States, residing at Cleveland, in the county of Cuyahoga and State of Ohio, have invented a certain new and useful Improvement in Condenser Arrangements, of which the following is a full, clear, and exact description.

This invention relates to an arrangement of condensers for producing certain electrical effects in connection with various forms of electrical apparatus to which it is adapted.

For the purposes of disclosure I have shown and described a mechanical current transforming device and associated therewith condensers arranged in accordance with my invention.

Generally speaking, the invention comprises the elements and combinations thereof set forth in the accompanying claims.

Reference should be had to the accompanying drawings forming a part of this specification in which—

Figure 1 is a top plan view of a mechanical transforming device and Fig. 2 is a diagrammatic representation of the manner of arrangement of the condensers in connection with this machine.

As before stated, the invention primarily relates to an arrangement or grouping of condensers, which condensers are connected in a closed series. At two points in this series of condensers,—a source of direct current is connected and at two other points in this series of condensers, which points are intermediate the first mentioned points and upon opposite sides of the series, alternating current conductors are connected, which alternating current has been transformed from the direct current first mentioned. The alternating current circuit contains in series a primary element of a transforming device.

Referring to the drawings, the mechanical transforming device will be seen in top plan view in Fig. 1. This device in general consists of a motor M' upon the extended shaft of which is mounted an annular body Z having the periphery formed with a plurality of parallel conducting bars or segments which are insulated from each other. Upon a further extension of the motor shaft are arranged a series of rings A, B, C, etc., which are contacted by collecting members or brushes as represented at K and L.

The bars or segments upon the rotating body Z are arranged in groups. For example, every sixth bar may be connected, and this group of bars connected to ring A, while other groups may be connected to the rings B, C, etc. Suitable brushes D and E are supported upon rings F and project parallel with the segments upon the rotating body, and in these holders one or more brushes may be mounted. The rings F are mounted upon a flanged extension G which is carried by the motor casing. The brushes D and E are connected with a suitable source of direct current by means of the conductors H and I. The rings A and B are contacted by current collectors J and K which in turn are connected with conductors L and M.

The direct current delivery to the brushes D and E is transformed into an alternating current and in this form is delivered over the conductors L and M. The frequency of the alternating current may be controlled by the rotation of the annular member or, in other words, by the number of times which the circuit is made and broken in a given period of time by the rotation of the annular member Z.

It will be perfectly apparent that this device described is merely one form of such devices, and inasmuch as it forms no part of the invention disclosed herein, it will not be further described.

Mention has before been made that the segments upon the annular member carried by the motor shaft might be divided into groups of six, but it will be apparent that other groupings of the segments or bars may be made, and for the purpose of more easily illustrating the same, I am assuming, for the purpose of further disclosure of this invention, that the alternate bars are joined to each other.

Referring to Fig. 2, a portion of the segments or bars carried by the annular member will be represented at N, O, P, Q, and as indicated in the drawing, the segments N and P are connected, while the segments O and Q are connected. This mode of connection will extend throughout the series of bars or segments and all of the bars N, P, etc., will be joined to a common conductor R', while all the segments O, Q, etc., will be connected with a common conductor S. These conductors R' and S are connected respectively with the rings A and B as heretofore described. The brushes D and E bear upon the segments and, in the position shown, are at present bearing upon the segments N and O. It will therefore be apparent that the current path is as follows: conductor H, brush D, segment N, conductor R', ring A, collector K, thence through the line L, back to the line M, collector J, ring B, conductor S, segment O, brush E and conductor I. The next position which the brushes D and E will assume is represented by dotted lines and by the reference characters D' and E' and this illustration is made merely to show the relative position between the segments O, P and brushes D', E', for, as a matter of fact, it will be understood that the brushes D and E do not move but that the segments rotate. In the rotation of the segments, so that the brushes occupy the relative positions which have just been suggested, it will be necessary for the brush D to break its contact with the segment N and pass to the segment O, the same being true of the brush E with respect to the segments O and P. In doing this the spark or arc which would be formed as the current is broken, would be so great as to prohibit the use of any such machine without a means being provided to kill the spark or at least reduce it to such an extent as to render it harmless. For this purpose and other purposes which will later be described, a series of condensers are arranged in the form of a parallelogram or double delta, these condensers being indicated at $a$, $b$, $c$, and $d$. These condensers are all connected with each other in series. At one corner of the parallelogram the brush D is connected by means of the conductor T, and at a point opposite to the first mentioned point, the brush E is connected by means of a conductor U. The collector K is also connected by means of a conductor V with another point of the series of condensers which is intermediate the points at which the brushes D and E are connected, and the collector J is connected by means of a conductor W with another point in the series of conductors which is opposite the point to which the collector K is connected and intermediate the points at which the brushes D and E are connected. It will be apparent that as the brush D breaks or passes from the segment N the current, which will tend to pass across the break will still find a path through the conductor T, condenser $d$, conductor V to the collector K and that the current passing between the brush E and the segment O will still find a path from the collector J through the conductor W, condenser $b$, conductor V and brush E.

When the brushes are in the positions indicated at D' and E', the path of the current is as follows: segment O, conductor S, ring V, collector J, line M, line L, collector K, ring A, conductor R', segment E and thence to the brush, from which it will be seen that the current flowing in the conductors L and M is in a direction reverse from that which was first described. When the brushes D' and E' break with the segments O and P the current which would then be flowing would find a path as follows: segment O, conductor S, ring B, collector J, conductor W, condenser $a$, conductor T, and thence to the brush D' which is connected to the line, and the current flowing between the brush E' and the segment P would find a path as follows: line L, collector K, conductor V, condenser $c$, conductor U, brush E' which is connected with the line, segment P, conductor R', ring A, and collector K. The above circuits which include the condensers are simply stated as what it is believed takes place, but I do not wish to say that this is the only action, for the condensers may have some interaction, which is more than possible.

From the above it will be seen that in the first instance the condensers $d$ and $b$ form the circuit when the brush has broken their contact with the segments N and O, while the condensers $a$ and $c$ are in the current path when the brushes break with the segments O and P. As the member carrying the segments rotates further, the conditions again become the same as that first described,—that is to say, the brush D would connect with the segment P while the brush E would bear upon the segment Q, which segments are in electrical connection respectively with the segments N and O. Therefore, the conditions would be the same.

From the above, it will be clear that at all times there is a condenser in parallel between each brush and each current collector which, as before stated, is connected with the line L, M, or in other words, there is always a condenser in parallel across the break in the circuit.

The above described action would take place regardless of the load which was upon the external circuit L, M, but if this external circuit carry an inductive load, it is found that an additional action takes place, namely, that surging or resonant currents are set up between the condenser and inductive load so that, in the interval between which the brushes are passing from one live segment to the next live segment, the condensers discharge themselves through the inductive load in the form of an oscillating current. Such an inductive load as has been mentioned is shown in Fig. 2 in the form of a primary coil of which the secondary is shown at Y, the secondary being connected with suitable conductors Y' and Y² in the manner which will be well understood.

For the purpose of adding capacity to the primary circuit L, X, M, I have found it advantageous to place a condenser $e$ between the points in the series of condensers with which the conductors V and W connect. As just stated, this condenser $e$ adds capacity to the primary circuit, and at the same time materially assists in the matter of the oscillating currents which have heretofore been referred to.

While I have shown the condensers connected in the form of a parallelogram or double delta, it will be apparent that other forms of arrangements may be used in producing the same effects and, furthermore, while the condensers A, B, C, D and E are shown as single condensers, this is merely illustrative, and the area of condensing surface need not necessarily be the same in each of the condensers.

Having thus described my invention, what I claim is:

1. A plurality of condensers connected in series to form a closed circuit, terminals of a circuit connected at two points to said condenser circuit, terminals of a second circuit connected at points upon opposite sides of the condenser circuit, which points are intermediate to the points of connection of the first mentioned circuit.

2. A plurality of condensers connected in series to form a closed circuit, a source of current connected with said condenser circuit at two points, and terminals of another circuit connected with the condenser circuit which are on opposite sides of the condenser circuit, and said points being intermediate the points of connection with the first mentioned circuit.

3. A plurality of condensers connected in series to form a closed circuit, a source of current connected with said condenser circuit at different points thereon, and terminals of another circuit connected with the condenser circuit at opposite points thereon, which latter points are intermediate between the points first referred to, and one or more condensers connected between the last mentioned points in the condenser circuit.

4. A plurality of condensers arranged substantially as a parallelogram, the said condensers being electrically connected in series, a source of current connected with said condensers at different corners of the parallelogram and terminals of another circuit connected with the remaining corners of the parallelogram.

5. A plurality of condensers arranged substantially as a parallelogram, the said condensers being electrically connected in series, a source of current connected with said condensers at opposite corners of the parallelogram, and terminals of another circuit connected with the remaining corners of the parallelogram, and a condenser between the last mentioned corners of the parallelogram for the purpose described.

6. A plurality of condensers connected in series to form a closed circuit, a source of current connected with said condenser circuit at opposite points thereon and terminals of another circuit connected with the condenser circuit at different points thereon, which latter points are intermediate the points first referred to and a primary element of a transformer connected in parallel with the last mentioned circuit.

7. A plurality of condensers connected in series to form a closed circuit, a source of current connected with said condenser circuit at different points thereon, and terminals of another circuit connected with the condenser circuit at opposite points thereon, which latter points are intermediate the points first referred to, one or more condensers connected between the last mentioned points and the condenser circuit, and a primary element of a transformer connected in parallel with the second circuit.

8. The combination with a device for changing direct current into alternating current, a source of current for said device, a plurality of condensers in series arranged as a parallelogram, the said source of current being connected to two opposite corners of the parallelogram, the other two corners being connected with the circuit carrying the alternating current upon the said device, and a primary element of a transformer in the said alternating circuit.

9. The combination with a direct current circuit, an alternating current circuit, a device adapted to connect each side of one circuit alternately with the sides of the other circuit, and a plurality of condensers electrically connected in series and forming a closed circuit, one of said circuits being connected to the condenser circuit at two points thereon, the other circuit being connected at two other points upon opposite sides of the circuit and intermediate the first two points.

10. The combination with an alternating current circuit a mechanical transforming device connected with said circuit and transforming the alternating current to direct current, a direct current circuit supply from said transforming device, and a plurality of condensers electrically connected in series and arranged as a closed circuit, one of the above mentioned circuits being connected with the condenser circuit at two points thereon, the other of the said circuits being connected at two points upon opposite sides thereof and intermediate the points of connection of the first mentioned circuit.

In testimony whereof, I hereunto affix my signature in the presence of two witnesses.

ARTHUR R. BULLOCK.

Witnesses:
A. J. HUDSON,
H. R. SULLIVAN.